F. C. NEUMAN.
EXTENSIBLE CAR STEPS.
APPLICATION FILED SEPT. 29, 1917.
1,257,629.
Patented Feb. 26, 1918.
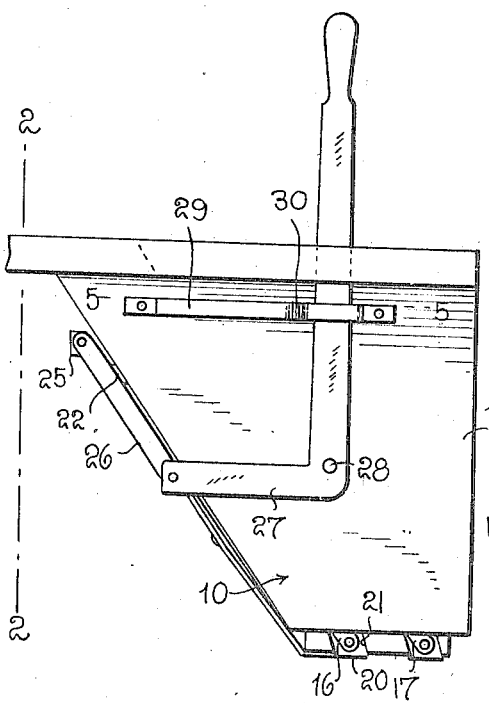
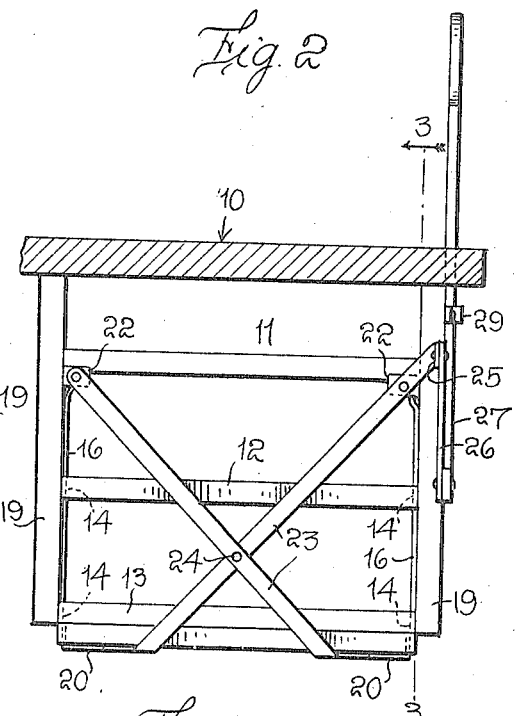
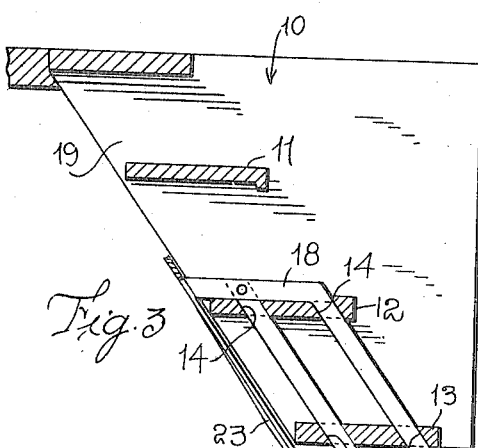
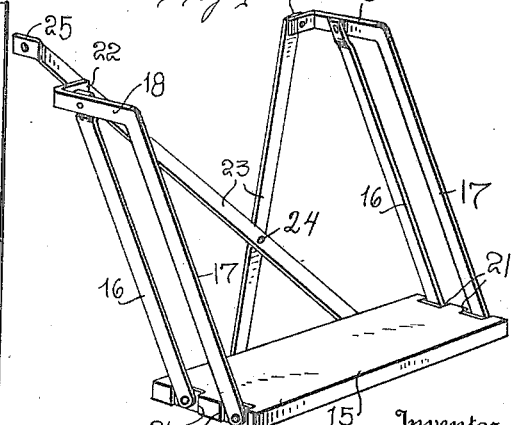
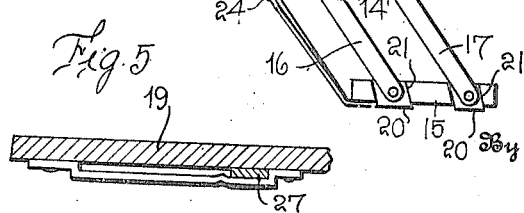
F. C. NEUMAN
By Watson E. Coleman
Attorney

UNITED STATES PATENT OFFICE.

FRED C. NEUMAN, OF MICHIGAN CITY, INDIANA.

EXTENSIBLE CAR-STEPS.

1,257,629. Specification of Letters Patent. Patented Feb. 26, 1918.

Application filed September 29, 1917. Serial No. 193,990.

*To all whom it may concern:*

Be it known that I, FRED C. NEUMAN, citizen of the United States, residing at Michigan City, in the county of Laporte and State of Indiana, have invented certain new and useful Improvements in Extensible Car-Steps, of which the following is a specification, reference being had to the accompanying drawings.

This invention relates to car steps, and particularly to extensible steps for railway cars.

The general object of my invention is to provide a lower tread for a flight of car steps, which tread is shiftable downward, into operative relation to the other treads, or shiftable upward to a position beneath the lowest tread of the fixed car steps.

A further object of the invention is to provide a very simple construction to this end, and provide means for shifting the lower tread which is of a very simple character and which may be readily manipulated.

Another object is to provide a construction of this kind, in which the supporting members for the lower steps are thoroughly braced and guided so that they cannot become stuck, and provide a very strong support for the lower tread.

Other objects will appear in the course of the following description.

My invention is illustrated in the accompanying drawings, wherein:—

Figure 1 is a side elevation of a portion of a car platform with my improved steps drawn up to a retracted position;

Fig. 2 is a section on the line 2—2 of Fig. 1;

Fig. 3 is a section on the line 3—3 of Fig. 2;

Fig. 4 is a perspective view of the supporting frame which carries the shiftable step; and Fig. 5 is a section on the line 5—5 of Fig. 1.

Referring to these drawings, 10 designates a flight of permanent car steps, such as are ordinarily found on passenger cars or in like situations, and including a plurality of treads 11, 12 and 13. The ends of the treads 12 and 13 are formed with the recesses 14 or slots extending downward and forward through one end of the tread. The lower tread 15, which is of the same size as the treads 11, 12 and 13 is carried at each end by upwardly and rearwardly extending supporting bars 16 and 17. The bar 16 extends straight upward and rearward through the rearmost slot 14, while each of the bars 17 extends upward and rearward to a position between the steps 11 and 12 and then extends rearward as at 18 to a point beyond the side walls 19 of the steps. Clips 20 are attached to the under faces of the steps and extend upward into grooves 21 and the bars 16 and 17 are riveted, bolted or otherwise attached to these clips. At their upper ends, both of the bars 16 are riveted, bolted or otherwise attached to the horizontal portions 18 of the bars 17. The portions 18 of the bars 17 extend beyond the point of connection to the bars 16 and then are inwardly bent as at 22.

Disposed at the back of the steps are the cross bars 23, which are riveted or bolted to each other at 24 at their point of intersection. The lower ends of both of these bars are bent beneath the lower tread 15 and riveted or bolted thereto, or otherwise secured, and the upper ends of both of the bars are riveted or bolted to the inwardly extending ends 22 of the bars 17. One of the bars 23 extends laterally beyond the bar 17, to which it is riveted, and then is bent outward to form an ear 25, and pivotally connected to this ear is a downwardly directed link 26, which in turn is pivotally connected to an angular lever 27, pivoted at 28 to the side wall 19 and extended upward above the top of the steps and the platform of the cars. This lever may operate between the wall 19 and a guide strip 29 and this guide strip 29 may be provided with a deflected portion 30 to hold the lever in its adjusted positions, and particularly to hold the lever with the tread 15 raised.

The practical use of this invention will be obvious from the description. Normally, and while the car is running, the tread 15 will be raised, as illustrated in Fig. 1, but when the car stops, the tread may be lowered by shifting the lever 27 and when the lever is fully thrown over the tread 15 will be fully lowered and the portions 18 of the bars 17 will engage with the step 12, this step 12 thus acting to carry the weight of the tread 15 and of the person stepping upon the tread. The weight will also be carried, of course, by the step 12. When the tread 15 is moved upward, it is disposed immediately beneath the tread 13.

Having described my invention, what I claim is:—

1. The combination with a car step including a plurality of permanent treads and side walls, certain of the permanent treads being upwardly and rearwardly slotted at their ends, of an extensible tread disposed below the lowermost permanent tread, upwardly and rearwardly extending pairs of bars attached at their lower ends to the extensible tread and passing upward through said grooves in the permanent treads, the outermost bar of each pair of bars being rearwardly bent and attached to the rearmost bar of each pair, and manually operable means for shifting the extensible tread upward or downward.

2. The combination with a car step including a plurality of permanent treads and side walls, certain of the permanent treads being upwardly and rearwardly slotted at their ends, of an extensible tread disposed below the lowermost permanent tread, upwardly and rearwardly extending pairs of bars attached at their lower ends to the extensible tread and passing upward through said grooves in the permanent treads, the outermost bar of each pair of bars being rearwardly bent and attached to the rearmost bar of each pair, crossed braces connected at their lower ends to the extensible tread and at their upper ends to the rearward extensions of said bars, a lever mounted upon the side wall of the car steps, and a link operatively connecting the lever to one of said crossed bars.

3. The combination with a car step including a plurality of permanent treads and side walls, certain of the permanent treads being upwardly and rearwardly slotted at their ends, of an extensible tread disposed below the lowermost permanent tread, upwardly and rearwardly extending pairs of bars attached at their lower ends to the extensible tread and passing upward through said grooves in the permanent treads, the outermost bar of each pair of bars being rearwardly bent and attached to the rearmost bar of each pair, crossed braces connected at their lower ends to the extensible tread and at their upper ends to the rearward extensions of said bars, an angular lever pivotally mounted upon the side wall of the car steps and extending up above the car platform, and a link pivoted to the lower end of the lever and extending upward and rearward and pivotally connected to one of said crossed braces.

In testimony whereof I hereunto affix my signature in the presence of two witnesses.

FRED C. NEUMAN.

Witnesses:
Mrs. Wm. E. Neuman,
J. J. Watson.

Copies of this patent may be obtained for five cents each, by addressing the "Commissioner of Patents, Washington, D. C."